United States Patent Office 3,658,826
Patented Apr. 25, 1972

3,658,826
SUBSTITUTED QUATERNARY PYRIDINIUM SALTS AND METHOD OF MANUFACTURING THEM
John Valdemar Brammer Petersen, Farum, Denmark, assignor to Niels Clauson-Kaas, Farum, Denmark
No Drawing. Filed May 22, 1969, Ser. No. 827,028
Int. Cl. C07d 31/44
U.S. Cl. 260—294.9
12 Claims

ABSTRACT OF THE DISCLOSURE

The present invention relates to a new group of substituted quaternary pyridinium salts with the general formula

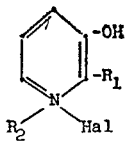

in which $R_2$ is a lower alkyl group, especially methyl and ethyl, an aryl group, especially phenyl, or an aralkyl group, especially benzyl,
in which $R_1$ is —CN or —CONH$_2$, and
in which Hal is a halogen, especially chlorine.

The new compounds are valuable intermediates for the manufacture of drugs.

DESCRIPTION OF THE INVENTION

It is known that the derivatives of 3-hydroxy-picolinic-2-acid, especially its amides, are valuable intermediates for the manufacture of drugs. The Swiss Patent 415,630, page 1, lines 55–67, mentions e.g. the use of 3-hydroxypicolinic-2-acid amides as starting materials for the manufacture of 2,4-dioxo-3,4-dihydro-2H-pyrido[2,3-e][1,3] oxazine and its 3-alkyl derivatives, substances with analgetic, antipyretic and antiphlogistic properties. According to the Swiss Patent 415,630 a furylhydantoin is used as starting material for the manufacture of 3-hydroxy-picolinic-2-acid amides. According to the present invention the manufacture of 3-hydroxy-picolinic-2-acid derivatives is facilitated by the use of new intermediates. The general formula of the new intermediates which are quaternary pyridinium salts is

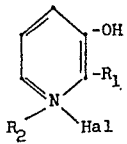

in which $R_2$ is a lower alkyl group, especially methyl and ethyl, an aryl group, especially phenyl, or an aralkyl group, especially benzyl,
in which $R_1$ is —CN or —CONH, and
in which Hal is a halogen, especially chlorine.

When heating the said new quaternary pyridinium salts under such conditions of temperature and pressure that $R_2$Hal is split-off (cp. the third paragraph of Example 10 and the second paragraphs of Examples 11 and 12), 3-hydroxy-picolinic-2-acid nitriles and amides are formed which compounds thus become available in a much more simple way than before.

The invention relates also to the manufacture of the new pyridinium salts with the general formula

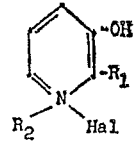

in which $R_2$ is a lower alkyl group, especially methyl and ethyl, an aryl group, especially phenyl, or an aralkyl group, especially benzyl,
in which $R_1$ is —CN or —CONH$_2$, and
in which Hal is a halogen, especially chlorine.

by oxidising a furane compound, i.e. a N-monoalkyl-, monoaryl- or monoarakyl-substituted 2-(α-aminoalkyl)-furnace with the general formula

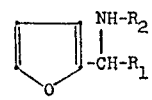

in which $R_1$ and $R_2$ have the above meaning, in an aqueous solution with the aid of a halogen or an in situ halogen generating agent, especially chlorine.

Similar conversions of furane derivatives into pyridine derivatives are known e.g. through the British Pats. 798,-320 and 862,581, but it has not been suggested before to apply the known conversion method to 2-(α-aminoalkyl)-furanes mono-substituted in the amino group by an alkyl, aryl or aralkyl group. The said substitution in the amino group is the condition which has to be fulfilled for obtaining by the oxidation with the aid of a halogen quaternary pyridinium salts with the general Formula I. Furthermore, the mentioned British patents do not deal with the manufacture of picolinic-2-acid derivatives, i.e. 3-pyridinols which in 2-position are substituted by a —CN or —CONH$_2$ group.

The invention is illustrated by the following examples: Examples 1, 2, 3, 4, 5, 6 and 7 relate to the manufacture of furane derivatives with the general Formula II whereas Examples 8, 9, 10, 11 and 12 relate to the manufacture of quaternary pyridinium salts with the general Formula I. All temperatures relate to Celsius degrees.

Example 1.—α-(Methylamino)-2-furanacetonitrile
(Compound A)

A mixture of furfural (38.4 g., 0.400 mole) and acetic acid (24.0 g., 0.400 mole) was added to a well-stirred solution of sodium cyanide (19.6 g., 0.400 mole) in water (140 ml.) at 0–5° over a period of about 15 min. Efficient cooling was required. Methylamine (31.0 g. of a 40% aqueous solution, 0.400 mole) was added in one portion to the resulting light brown emulsion of cyanohydrin, the temperature of the reaction mixture rising to 20°. The emulsion was stirred for 2 h. at room temperature; a suspension of canary-yellow crystals of A was obtained. Scratching is sometimes necessary to induce crystallization. After cooling to 0° the crystals were isolated by filtration, washed with three 50 ml. portions of water of 0°, and dried (25°, 10 mm.). A (48.4 g., 89%) was obtained as yellow crystals, M.P. 39–40°. Crystallization from methylcyclohexane gave white crystals with constant M.P. (40–41°).

[Found (percent): C, 61.7; H, 6.0; N, 20.5. Calc. for $C_7H_8N_2O$ (136.2) (percent): C, 61.8; H, 5.9; N, 20.6.]

A deteriorates on standing. The hydrochloride of A, which is stable, may be prepared by treatment of A with an equimolar amount of concentrated hydrochloric acid, evaporation to dryness on the water bath (100°) under reduced pressure, and trituration and washing of the resulting crystalline residue with acetone. The hydrochloride of A melts at 127–128°.

Example 2.—α-(Ethylamino)-2-furanacetonitrile (Compound B)

An emulsion of furfural cyanohydrin was prepared as described above. Ethylamine (25.7 g., 70% aqueous solution, 0.400 mole) was added, the mixture stirred for 2 h., and the resulting emulsion of B extracted with three 100 ml. portions of ether. The combined ethereal extracts were extracted with 3 N hydrochloric acid (150 ml., 0.45 mole), and the acid phase was evaporated to dryness on the water bath (100°) under reduced pressure. The crystalline residue was triturated in a mortar with acetone, isolated by filtration, washed with acetone, and dried in a hood at 100°. The hydrochloride of B (52.7 g., 71%) was obtained as white crystals, M.P. 127–129° (decomp.). A sample crystallized from ethanol had M.P. 125–128° (decomp.).

[Found (percent): C, 51.4; H, 6.0; Cl⁻, 19.0; N, 15.0. Calc. for $C_8H_{11}ClN_2O$ (186.6) (percent): C, 51.6; H, 5.9; Cl⁻, 19.0; N, 15.0.]

Example 3.—α-(Benzylamino)-2-furanacetonitrile (Compound C)

An emulsion of furfural cyanohydrin was prepared as described above. Benzylamine (42.9 g., 0.400 mole) was added, the emulsion stirred for 2 h. at room temperature, and then poured into 6 N hydrochloric acid (150 ml.) with efficient stirring. The resulting grey crystalline precipate was isolated by filtration, washed with three 50 ml. portions of 3 N hydrochloric acid and with acetone, and then dried in a hood at 50°. The hydrochloride of C (80.0 g., 80%) was obtained, M.P. 128–129° 'decomp.). A sample crystallized from 99% ethanol had the same M.P.

[Found (percent): C, 62.8; H, 5.3; Cl⁻, 14.3; N, 10.9. Calc. for $C_{13}H_{13}ClN_2O$ (248.7) (percent): C, 62.8; H, 5.3; Cl⁻, 14.3; N, 11.2.]

Example 4.—α-(Methylamino)-2-furanacetamide (Compound D)

A suspension of canary-yellow crystals of A was prepared as described in Example 1, and extracted with three 50 ml. portions of ether. The combined ethereal extracts were dried over magnesium sulfate and evaporated to dryness on the water bath (30°) under reduced pressure. The resulting tea-colored oily or semisolid residue of crude A was poured slowly into concentrated hydrochloric acid (150 ml.) at 0–10° with efficient stirring, forming a precipitate of the hydrochloride of A. The temperature was allowed to rise to 25° and was kept there for 4 h. The resulting thick dark suspension of the hydrochloride of D was cooled to 0°, and the precipitate isolated by filtration, washed with acetone on the filter (without stirring), and dried at 100°. The hydrochloride of D (61.6 g., 81%) was obtained as slightly grey crystals, M.P. 263° (decomp.). A sample crystallized from water had the same M.P.

[Found (percent): C, 44.2; H, 5.9; Cl⁻, 18.7; N, 14.5. Calc. for $C_7H_{11}ClN_2O_2$ (190.6) (percent: C, 44.1; H, 5.8; Cl⁻, 18.6; N, 14.7.]

Example 5.—α-(Ethylamino)-2-furanacetamide (Compound E)

An emulsion of B was prepared as described in Example 2, and added with stirring to concentrated hydrochloric acid (800 ml.). The resulting clear solution was left standing at room temperature for 21 h. The dark solution now containing the hydrochloride of E, was evaporated to dryness on the water bath (100°) under reduced pressure. The crystalline residue was dissolved in 3 N sodium hydroxide (500 ml.). Addition of 40% aqueous sodium hydroxide (150 ml.) caused an oil to separate. Extraction with three 150 ml. portions of ether and evaporation of the combined ethereal extracts on the water bath (100°) under reduced pressure gave a light brown oil (35.0 g.), which crystallized on scratching. Crystallization from carbon tetrachloride (100 ml.) gave E (31.0 g., 46%) as fine yellow crystals, M.P. 72–76°. Recrystallization from toluene to constant M.P. gave white crystals, M.P. 75–77°.

[Found (percent): C, 57.2; H, 7.4; N, 16.5. Calc. for $C_8H_{12}N_2O_2$ (168.2) (percent): C, 57.1; H, 7.2; N, 16.7.]

Example 6.—α-(Benzylamino)-2-furanacetamide (Compound F)

An emulsion of C was prepared as described in Example 3. The emulsion was extracted with ether (100 ml.) and the ethereal extract dissolved in concentrated hydrochloric acid (800 ml.) with stirring. The resulting dark solution was left standing overnight at room temperature. Evaporation on the water bath (100°) under reduced pressure gave a thick dark residue, which after boiling with acetone (300 ml.) was converted into a brown crystalline paste. On filtration, washing with acetone, and drying at room temperature, a brown crystalline product was obtained. This was dissolved in hot 99% ethanol (175 ml.) and precipitated with hot acetone (175 ml.). The crystalline precipitate was isolated by filtration, washed with acetone, and dried at room temperature to give white impure hydrochloride of F (78.0 g.), M.P. 198–200° (decomp., softening from 107°). Stirring with 0.7 N sodium hydroxide (535 ml.) precipitated crude crystalline F. It was filtered off, dissolved in methanol (150 ml.), and precipitated with water (400 ml.). Upon filtration, washing with water, and drying (50°, 10 mm.) F (30.6 g., 33%) was obtained as white crystals, M.P. 70–72°. A sample was recrystallized from carbon tetrachloride to constant M.P. (71–72°).

[Found (percent): C, 67.6; H, 6.0; N, 12.2 Calc. for $C_{13}H_{14}N_2O_2$ (230.3) (percent): C, 67.8; H, 6.1; N, 12.2.]

Example 7.—1-methyl-2-cyano-3-hydroxypyridinium chloride (Compound G)

4.09 g. (30.0 mmole) of A were dissolved in 8 N hydrochloric acid (30 ml.). Chlorine (2.2 g., 31 mmole) was passed into the solution at 15–25° with efficient stirring over a period of about 20 min. The resulting light yellow solution was evaporated to dryness on the water bath (100°) under reduced pressure and the reddish crystalline residue was washed on a filter with 99% ethanol (two 10 ml. portions) and acetone, and dried (100°, 1 mm.). G (1.62 g., 32%) was obtained as white crystals, M.P. 204–213° (decomp.). Crystallization from 99% ethanol (130 ml.) gave 1.13 g., M.P. 209–213° (decomp.).

[Found (percent): C, 49.1; H, 4.3; Cl⁻, 20.6; N, 16.3. Calc. for $C_7H_7ClN_2O$ (17.6) (percent): C, 49.2; H, 4.1; Cl⁻, 20.8; N, 16.4.]

Example 8.—1-ethyl-2-cyano-3-hydroxypyridinium chloride (Compound H)

The hydrochloride of B (9.33 g., 50.0 mmole) was dissolved in 4 N hydrochloric acid (90 ml.) at 50°. Chlorine (3.9 g., 55 mmole) was passed into the solution at 50–55° with efficient stirring over a period of about 20 min. The tea-colored reaction mixture was evaporated to dryness on the water bath (100°) under reduced pressure. The resulting brown crystalline residue was crystallized from 99% ethanol (250 ml.). H (3.07 g., 33%) was obtained as white crystals, M.P. 220–223° (decomp.).

[Found (percent): C, 51.8; H, 5.0; Cl⁻, 19.1; N, 15.1. Calc. for $C_8H_9ClN_2O$ (184.6) (percent): C, 52.0; H, 4.9; Cl⁻, 19.2; N, 15.2.]

Example 9.—1-benzyl-2-cyano-3-hydroxypyridinium chloride (Compound I)

The hydrochloride of C (12.44 g., 50.0 mmole) was suspended in 4 N hydrochloric acid (90 ml.) at 50°.

Chlorine (3.9 g., 55 mmole) was passed into the suspension at 50–55° with efficient stirring over a period of about 20 min. The resulting yellow suspension was filtered in order to remove some unchanged starting material. The filtrate, which turned red during filtration, was evaporated to dryness on the water bath (100°) under reduced pressure. The brown semicrystalline residue was treated with acetone, filtered, and washed with acetone and 99% ethanol. I (3.55 g., 29%) was obtained as grey crystals, M.P. 158–160°. Crystallization from 99% ethanol (40 ml.) gave white crystals (2.20 g.) with constant M.P. (162–164°).

[Found (percent): C, 63.1; H, 4.6; Cl⁻, 14.3; N, 11.3. Calc. for $C_{13}H_{11}ClN_2O$ (246.7) (percent): C, 63.3; H, 4.5; Cl⁻, 14.4; N, 11.4.]

Example 10.—1-methyl-2-carbamoyl-3-hydroxypyridinium chloride (Compound J)

Crude hydrochloride of D (19.1 g., 0.100 mole) was dissolved in water (200 ml.). Chlorine (7.5 g., 0.106 mole) was passed into the solution at 20–30° with efficient stirring over a period of about 45 min. The resulting faintly yellow solution was evaporated to dryness on the water bath (100°) under reduced pressure and the crystalline residue was triturated with acetone. The crystals were isolated by filtration, washed with two 15 ml. portions of ethanol and with acetone, and dried at 100°. J (17.9 g., 95%) was obtained as grey crystals, M.P. 265° (decomp.).

5.00 g. of this product were dissolved in hot 3 N hydrochloric acid (5.0 ml.). Acetone (30 ml.) was added and the mixture cooled to 0°. The precipitate was isolated by filtration, washed with acetone, and dried at 100°. J (4.70 g., 89%) was obtained as white crystals, M.P. 269° (decomp.).

[Found (percent): C, 44.6; H, 4.9; Cl⁻, 19.0; N, 14.9. Calc. for $C_7H_9ClN_2O_2$ (188.6) (percent): C, 44.6; H, 4.8; Cl⁻, 18.8; N, 14.9.]

J (1.00 g.) was placed in a test tube (I.D. 30 mm.) mounted at an angle. The tube was heated carefully with a flame, until no more gas was evolved. A small dark residue remained at the bottom of the tube. 3-hydroxypicolinamide (0.70 g., 96%) was scratched off the upper end of the tube, partly as a white sublimate, and partly as greenish-white solidified distillate; M.P. after homogenization 191–197°. Washing with methanol (1 ml.), water (1 ml.), and again with methanol (1 ml.), and drying gave 0.66 g., M.P. and mixed M.P. with an authentic sample 196–198°.

Example 11.—1-ethyl-2-carbamoyl-3-hydroxypyridinium chloride (Compound K)

5.04 g. (30.0 mmole) of E were dissolved in 0.75 N hydrochloric acid (40.0 ml.). Chlorine (2.3 g., 32 mmole) was passed into the solution at 20–30° with efficient stirring over a period of about 20 min. The colorless reaction mixture was decanted from a small amount of a sticky by-product and evaporated to dryness on the water bath (100°) under reduced pressure. The crystalline residue was boiled with acetone, isolated by filtration, and dried (100°). K (5.25 g., 87%) was obtained as white crystals, M.P. 249° (decomp.). Crystallization from ethanol did not change the M.P.

[Found (percent): C, 47.6; H, 5.6; Cl⁻, 17.4; N, 13.9. Calc. for $C_8H_{11}ClN_2O_2$ (202.6) (percent): C, 47.4; H, 5.5; Cl⁻, 17.5; N, 13.8.]

K (150 mg.) was kept in a sublimation tube at 270° for 15 min. The sublimate formed was washed as described above for the decomposition of J. 3-hydroxypicolinamide (83 mg., 81%) was obtained, M.P. 194–197°.

Example 12.—1-benzyl-2-carbamoyl-3-hydroxypyridinium chloride (Compound L)

6.90 g. (30.0 mmole) of F were dissolved in 1.5 N hydrochloric acid (40 ml.). Chlorine (2.3 g., 32 mmole) was passed into the solution at 25–35° with efficient stirring over a period of about 20 min. The resulting slightly yellow reaction mixture was decanted through a filter to remove a small quantity of solid material and evaporated to dryness on the water bath (100°) under reduced pressure. The crystalline residue was triturated with acetone, isolated by filtration, washed with two 10 ml. portions of 99% ethanol and with acetone, and dried (100°). L (5.04 g., 64%) was obtained as white crystals, M.P. 224° (decomp.). A sample was recrystallized from propanol to constant M.P. [225° (decomp.)].

[Found (percent): C, 58.7; H, 5.0; Cl⁻, 13.4; N, 10.5. Calc. for $C_{13}H_{13}ClN_2O_2$ (264.7) (percent): C, 58.9; H, 5.0; Cl⁻, 13.4; N, 10.6.]

L (100 mg.) was placed in a test tube (I.D. 8 mm.) and the tube inserted in an oil bath at 250° for 3 min. Some sublimate was formed. The tube was then evacuated (0.2 mm.) and the material in the tube (sublimate and residue) sublimed at 200°. 3-hydroxypicolinamide (50 mg., 96%) was obtained, M.P. 194–198.

Compounds G, H, I, J, K and L each gave an orange color with ferric chloride in aqueous solution. The color is distinctly different from the red color given by non-quaternary 3-pyridinols.

What I claim is:

1. A quaternary pyridinium salt with the general formula:

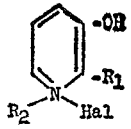

in which $R_1$ is selected from the group consisting of —CN and —CONH₂, $R_2$ is selected from the group consisting of lower alkyl, phenyl and phenyl lower alkyl groups; and in which Hal is a halogen.

2. The compound of claim 1 where $R_2$ is selected from the group consisting of methyl and ethyl.

3. The compound of claim 1 where $R_2$ is phenyl.

4. The compound of claim 1 where $R_2$ is benzyl.

5. The compound of claim 1 where Hal is chlorine.

6. The compound of claim 1 which is 1-methyl-2-cyano-3-hydroxypyridinium chloride.

7. The compound of claim 1 which is 1-ethyl-2-cyano-3-hydroxypyridinium chloride.

8. The compound of claim 1 which is 1-benzyl-2-cyano-3-hydroxypyridinium chloride.

9. The compound of claim 1 which is 1-methyl-2-carbamoyl-3-hydroxypyridinium chloride.

10. The compound of claim 1 which is 1-ethyl-2-carbamoyl-3-hydroxy-pyridinium chloride.

11. The compound of claim 1 which is 1-benzyl-2-carbamoyl-3-hydroxy-pyridinium chloride.

12. The process of converting a quaternary pyridinium salt having the general formula:

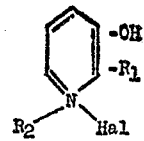

in which $R_1$ is selected from the group consisting of —CN and —CONH₂;

$R_2$ is selected from the group consisting of lower alkyl, phenyl and phenyl lower alkyl groups; and in which Hal is a halogen, into picolinic-2-acid derivatives having the general formula:

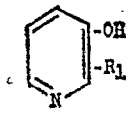

in which

R₁ is selected from the group consisting of —CN and —CONH₂ by heating the pyridinium salt under such temperature and pressure conditions necessary to cleave the R₂Hal.

References Cited

UNITED STATES PATENTS

| 3,461,128 | 8/1969 | Colchester et al. | 260—296 |
| 3,245,998 | 4/1966 | Clauson-Kaas et al. | 260—294.9 |

FOREIGN PATENTS

| 1,038,342 | 8/1966 | Great Britain | 260—294.9 |

ALAN L. ROTMAN, Primary Examiner

U.S. Cl. X.R.

260—295 AM

PO-1050
(5/69)

UNITED STATES PATENT OFFICE
CERTIFICATE OF CORRECTION

Patent No. 3,658,826          Dated  April 25, 1972

Inventor(s)    John V. B. Petersen

It is certified that error appears in the above-identified patent and that said Letters Patent are hereby corrected as shown below:

In Column 1, line 65, "-CONH" should read "-CONH$_2$".

In column 1, lines 15-24 and lines 53-61 and column 2, lines 5-10, "I" should be indicated to the right side of the formula.

In column 2, lines 20-24, "II" should be indicated to the right side of the formula.

Signed and sealed this 5th day of September 1972.

(SEAL)
Attest:

EDWARD M. FLETCHER, JR.          ROBERT GOTTSCHALK
Attesting Officer                Commissioner of Patents